(12) United States Patent
Daut

(10) Patent No.: US 10,471,515 B2
(45) Date of Patent: Nov. 12, 2019

(54) MEASURING DEVICE FOR A MACHINE TOOL AND CORRESPONDING MACHINE TOOL

(71) Applicant: Schaeffler Technologies AG & Co. KG, Herzogenaurach (DE)

(72) Inventor: Klaus Daut, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 202 days.

(21) Appl. No.: 15/567,984

(22) PCT Filed: Apr. 18, 2016

(86) PCT No.: PCT/DE2016/200189
§ 371 (c)(1),
(2) Date: Oct. 20, 2017

(87) PCT Pub. No.: WO2016/169563
PCT Pub. Date: Oct. 27, 2016

(65) Prior Publication Data
US 2018/0141129 A1 May 24, 2018

(30) Foreign Application Priority Data
Apr. 20, 2015 (DE) .................. 10 2015 207 108

(51) Int. Cl.
*G01B 5/012* (2006.01)
*B23B 25/06* (2006.01)
*B23Q 11/08* (2006.01)
*B23Q 17/20* (2006.01)
*B23Q 5/04* (2006.01)

(52) U.S. Cl.
CPC .............. *B23B 25/06* (2013.01); *B23Q 11/08* (2013.01); *B23Q 17/20* (2013.01); *B23Q 5/04* (2013.01)

(58) Field of Classification Search
CPC .................................. G01B 5/012; B23B 5/06
USPC ..................................................... 33/556, 559
See application file for complete search history.

(56) References Cited

U.S. PATENT DOCUMENTS

| 4,576,069 | A | 3/1986 | Bazuin | |
|---|---|---|---|---|
| 6,449,861 | B1* | 9/2002 | Danielli | G01B 5/012 33/503 |
| 6,760,980 | B1* | 7/2004 | Golinelli | F16C 29/0695 33/556 |
| 7,770,302 | B2* | 8/2010 | Tanaka | G01B 7/016 33/559 |
| 9,835,433 | B1* | 12/2017 | Antreasyan | G01B 11/007 |

(Continued)

FOREIGN PATENT DOCUMENTS

| DE | 2062685 A1 | 9/1971 |
|---|---|---|
| DE | 250080 A1 | 9/1987 |

(Continued)

*Primary Examiner* — George B Bennett
(74) *Attorney, Agent, or Firm* — Kevin L. Parks

(57) ABSTRACT

The disclosure relates to a measuring device for a machine tool comprising a tool drive. The measuring device may include a measurement head and a displaceably mounted protective cover, which can be moved by being driven by the tool drive in such a way that this protective cover selectively covers the measurement head or frees it for measurement. The disclosure furthermore relates to a machine tool having such a measuring device.

20 Claims, 2 Drawing Sheets

(56) References Cited

U.S. PATENT DOCUMENTS

| | | | | |
|---|---|---|---|---|
| 2006/0197541 A1* | 9/2006 | Madlener | ............... | G01B 5/012 324/691 |
| 2009/0288490 A1* | 11/2009 | Maruyama | ............. | B23Q 35/04 73/633 |
| 2016/0169656 A1* | 6/2016 | Padovani | ............. | G01B 21/047 33/503 |
| 2016/0201724 A1* | 7/2016 | Ross | ..................... | F16C 35/063 384/504 |
| 2016/0258732 A1* | 9/2016 | Hidaka | .................. | G01B 3/002 |
| 2018/0172416 A1* | 6/2018 | Jansson | .................. | G01B 5/012 |

FOREIGN PATENT DOCUMENTS

| | | |
|---|---|---|
| DE | 10136360 A1 | 2/2002 |
| EP | 2062686 A1 | 5/2009 |
| JP | H04105851 A | 4/1992 |
| WO | 02054009 A1 | 7/2002 |

* cited by examiner

MEASURING DEVICE FOR A MACHINE TOOL AND CORRESPONDING MACHINE TOOL

CROSS-REFERENCE TO RELATED APPLICATIONS

This application is the U.S. National Phase of PCT Appln. No. PCT/DE2016/200189 filed Apr. 18, 2016, which claims priority to DE 102015207108.1 filed Apr. 20, 2015, the entire disclosures of which are incorporated by reference herein.

TECHNICAL FIELD

The disclosure relates to a measuring device for a machine tool comprising a tool drive, the measuring device comprising a measurement sensor or a different measurement head. The disclosure furthermore relates to a machine tool having a tool drive for a tool and having such a measuring device.

BACKGROUND

An example of a measuring device are the MIDA™ of the model range T from the company Mapross. These measuring devices are suitable for machine tools such as processing centers, turning machines and milling machines. Such measuring devices for machine tools may be fastened on a free tool location on the tool revolver of these machine tools. The measurement heads of these measuring devices usually operate optically, by means of radio or by means of infrared, and transmit their signals directly during the measurement process. A disadvantage with such measuring devices, however, is that the highly sensitive measurement equipment of their measurement heads are unprotected from swarf, coolant and other media thrown around inside the machine tool.

SUMMARY

An object of the disclosure is to provide a measuring device, and a corresponding machine tool, which overcome the aforementioned difficulties.

A solution to the object may be achieved according to the disclosure by features disclosed herein and shown in the Figures.

In one example of the measuring device according to the disclosure, the measuring device comprises a displaceably mounted protective cover, which can be moved by being driven by the tool drive in such a way that this protective cover selectively covers the measurement head or frees it for measurement. The protective cover can thus be moved forward over the measurement head or back by the tool drive of the machine tool. The machine tool may generally comprise a location or a plurality of locations for fastening tools. The corresponding tools are usually machining tools, for instance cutters on a milling machine. In one configuration, the machine tool comprises a tool revolver having a plurality of locations for fastening tools, by means of which these tools can be actuated by the tool drive. Instead of a tool, the aforementioned measuring device may also be fastened on one of these locations in this case.

At the start of the measurement cycle, the tool drive is switched on and the protective cover is moved so that it releases the measurement head for measurement. The measurement with the measurement head then begins, and after the measurement the rotation direction of the tool drive is reversed so that the protective cover is moved in the opposite direction until it again covers the measurement head. Subsequently, the tool revolver swivels the processing tool into the processing position and the workpiece processing begins again. The measurement head is in this case protected by the protective cover against swarf and the like flying past.

The protective cover may be configured in this case as a protective sleeve. The protective sleeve generally protects the measurement head fully in relation to a longitudinal axis of the sleeve.

According to another embodiment of the disclosure, the measuring device comprises an end stop for the position to be covered and/or an end stop for the position enabling the measurement.

According to an example configuration of the disclosure, the measuring device comprises a transmission having at least one threaded spindle (for example a screw) and at least one engagement structure, which is in engagement with the threaded spindle, the protective cover being moved by the tool drive by means of this transmission. The engagement structure may be a toothing, with which the threaded spindle meshes. As an alternative, however, the engagement structure may also be formed simply just as a simple groove, a simple web, etc. In this way, the rotational movement of the tool drive is particularly straightforwardly converted into the usually linear movement of the protective cover. In one design, the engagement structure is part of the end stop, or of the end stops.

In this case, the protective cover comprises the at least one engagement structure. In this way, a particularly simple and effective transmission is obtained.

According to another configuration of the disclosure, the measuring device comprises a retainer, by means of which the measuring device can be fastened in or on a tool holder of the machine tool. The retainer is compatible with the locations of the machine tool.

In this case, a recess extending as far as the transmission is formed in the retainer, said recess allowing the tool drive to extend through the retainer as far as a transmission input of the transmission.

According to another embodiment of the disclosure, the measurement head is configured as a measurement sensor having a sensing arm. Measuring devices having measurement sensors are often used in machine tools.

According to another embodiment of the disclosure, the retainer externally circumferentially comprises a toothing structure for form-fit fastening on/in a location, intended for a tool, of the machine tool.

According to yet another embodiment of the disclosure, the measuring device has a longitudinal axis, along which the regions of the retainer, transmission and measurement head are arranged successively.

The disclosure furthermore relates to a machine tool having a tool drive and a measuring device as mentioned above. The tool drive may have an overload clutch. According to one embodiment of the disclosure, the machine tool comprises a tool revolver having a plurality of locations for tools.

BRIEF DESCRIPTION OF THE DRAWINGS

The disclosure will be explained by way of example below with the aid of exemplary embodiments with reference to the appended drawings, in the context of which the features presented below may represent an aspect of the disclosure both respectively individually and in combination.

DETAILED DESCRIPTION

Figure 1:
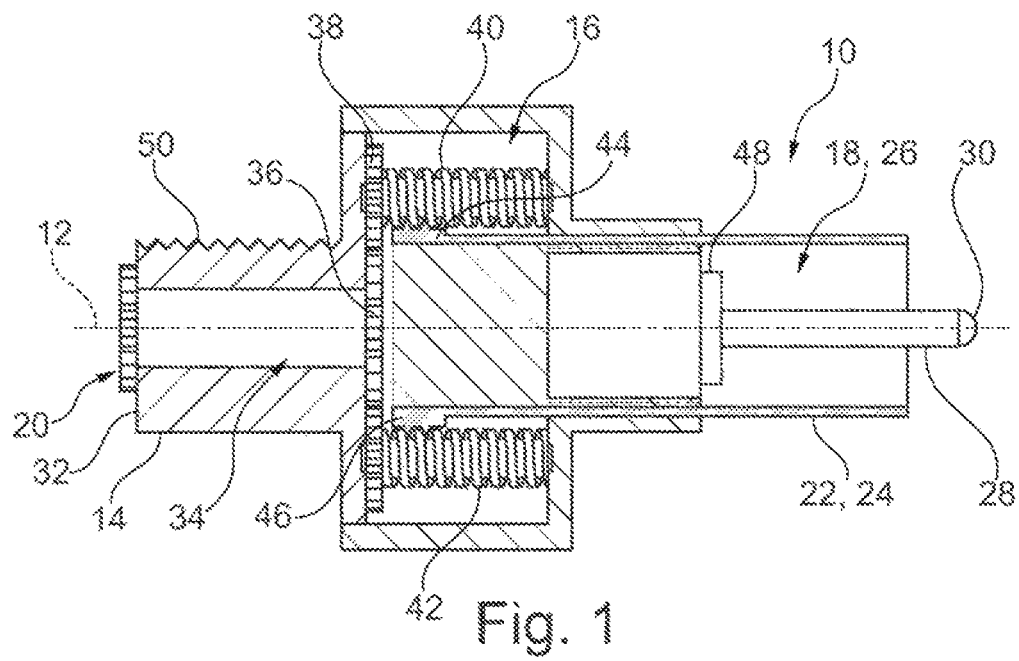
FIG. 1 shows a measuring device according to one embodiment of the disclosure in one sectional representation.

FIG. 1 shows a measuring device 10 for a machine tool (not shown) in a sectional representation with a section surface extending through the longitudinal axis 12 of the measuring device. A retainer 14, a transmission 16 and a measurement head 18 are arranged successively along the longitudinal axis 12. By means of the retainer 14, the measuring device 10 can be fastened on a location intended for a tool of the machine tool. The machine tool comprises a tool drive 20, which in the normal case drives the tool fastened on the location. In the example shown, the tool drive 20 generates a rotational movement as a drive movement. The measuring device 10 furthermore comprises a displaceably mounted protective cover 22, which can be moved by being driven by the tool drive 20 by means of the transmission 16 in such a way that this protective cover 22 selectively covers the measurement head 18 or frees it for measurement. The protective cover 22 is preferably configured as a protective sleeve 24, which is displaced linearly in order to selectively cover the measurement head 18 or free it for measurement. As an alternative, however, the protective cover 22 could also be configured as a protective shield. In the example shown, the measurement head 18 is configured as a measurement sensor 26 having a sensing arm 28. The free end of the sensing arm 28 forms one end 30 of the measuring device 10.

In the retainer 14, a recess 34 is formed which extends from the other end 32 of the measuring device 10 as far as a transmission input 36 of the transmission 16 and is configured as an opening, this recess allowing the tool drive 22 to extend through the retainer 14 as far as the transmission input 36. The transmission 16 comprises a pinion or toothed wheel arrangement 38 having a plurality of pinions/toothed wheels, two threaded spindles 40, 42 and engagement structures 44, 46 which are in engagement with the threaded spindles 40, 42. In the example shown, these engagement structures 44, 46 are configured as toothings meshing with the threaded spindles. The threaded spindles 40, 42 are in this case arranged on both sides of the protective cover 22 configured as a sleeve 24, and the engagement structures 44, 46 are parts of the outer circumference of this protective cover 22. A different number of threaded spindles 40, 42 may, of course, be envisioned.

In FIG. 1, the protective cover 22 is shown in the position in which it frees the measurement head 18 for measurement. The engagement structures 44, 46 lie at one end of the threaded spindles 40, 42, where they form an end stop. When the protective cover 22 is in the position (not shown) in which it covers the measurement head 18, the protective cover 22 is fully deployed along the axis 12 and the engagement structures 44, 46 lie at the other end of the threaded spindles 40, 42, where they form a further end stop.

The measuring device is battery-operated in one embodiment. When the battery needs to be replaced, or maintenance needs to be carried out on the measurement head 18, the measurement head 18 is unscrewed from the rest of the measuring device 10 at the (hexagonal) nut 48 (or alternatively with two insertion bores). The measurement head 18 itself is, for example, equipped with a standard M16×1 interface. The retainer 14 shown here is configured as a VDI 40 tool retainer with a typical toothing structure 50. As an alternative, however, the retainer 14 may also be a different tool retainer (for example Capto, BT, etc.).

The following functionality may be obtained:

At the start of the measurement cycle, the tool drive 20 is switched on and the protective cover 22 is pulled back by the tool drive 20 until it is fully retracted and the overload clutch of the tool drive 20 responds. The measurement with the measurement head 18 then begins. After the measurement, the rotation direction of the tool drive 20 is reversed and the protective cover 22 moves forward again. Subsequently, the revolver swivels and the processing begins again. Now, the measurement head 18—here, specifically the measurement sensor 26—is protected by the protective cover 22 from the swarf flying around.

The torque generated by the tool drive 20 is transmitted via the toothed wheel arrangement 38 (pinion) onto the screw drive (or alternatively also epicyclic gear drive) with the threaded spindles 40, 42. The threaded spindles 40, 42 engage in the engagement structures 44, 46, configured as toothings, of the protective cover 22 configured as a sleeve 24, and draw the protective cover back. Part 3 is also used as an end stop in both directions. The motor of the tool drive may be switched off by overload. As an alternative thereto, the transmission 16 may have a slip clutch at its transmission input 36.

Figure 2:
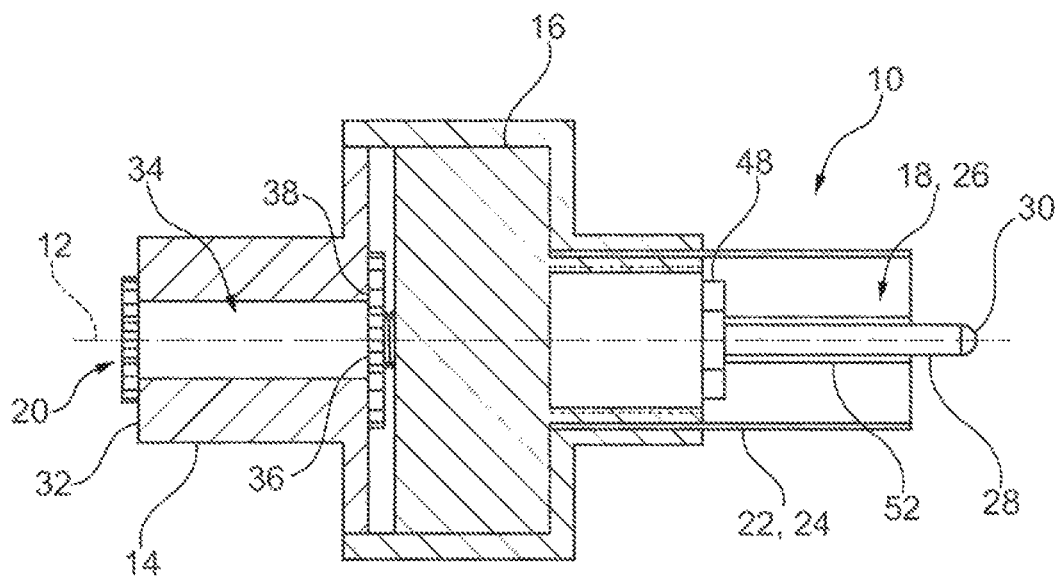
FIG. 2 shows the measuring device in another sectional representation.

FIG. 2 shows the measuring device 10 in a sectional representation through the axis 12, in which the section surface is perpendicular to the section surface shown in FIG. 1. Of the transmission 16, essentially only the transmission input 36 with the pinion/toothed wheel arrangement 38 can be seen. In addition, a guide structure 52 can now be seen in FIG. 2, by which the protective cover 22 is guided in a linearly mobile fashion. This structure can also be seen in FIG. 4. The forward and backward movement of the protective cover 22 is thus in this case a linear forward and backward pushing along the guide structure 52.

Figure 3:
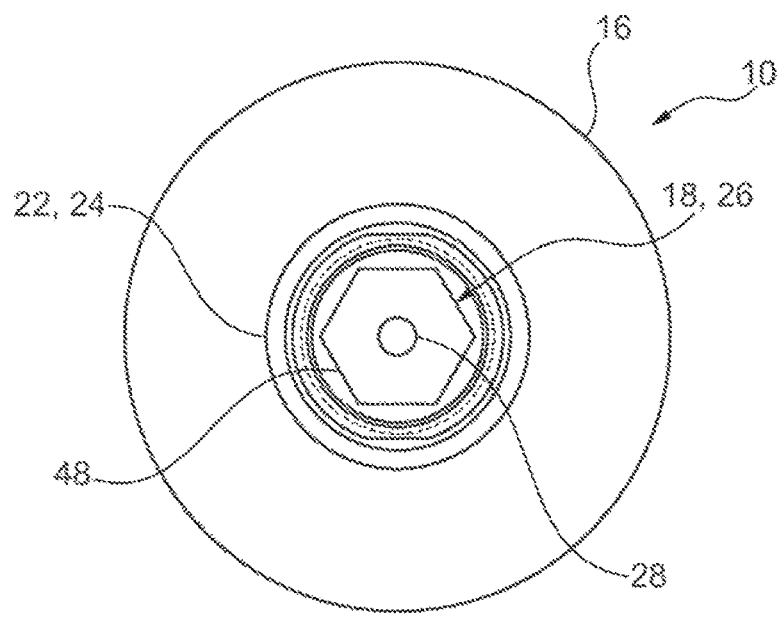
FIG. 3 shows the measuring device in a frontal representation.

FIG. 3 shows the measuring device 10 in a frontal representation. The measurement head 18, configured as a measurement sensor 26 with the sensing arm 28 and the nut 48, can be seen clearly. This measurement head is—in relation to the axis 12—enclosed circumferentially by the measurement cover 22 configured as a protective sleeve 24. The central part, which receives the transmission 16, of the measuring device 10 can furthermore be seen clearly.

Figure 4:
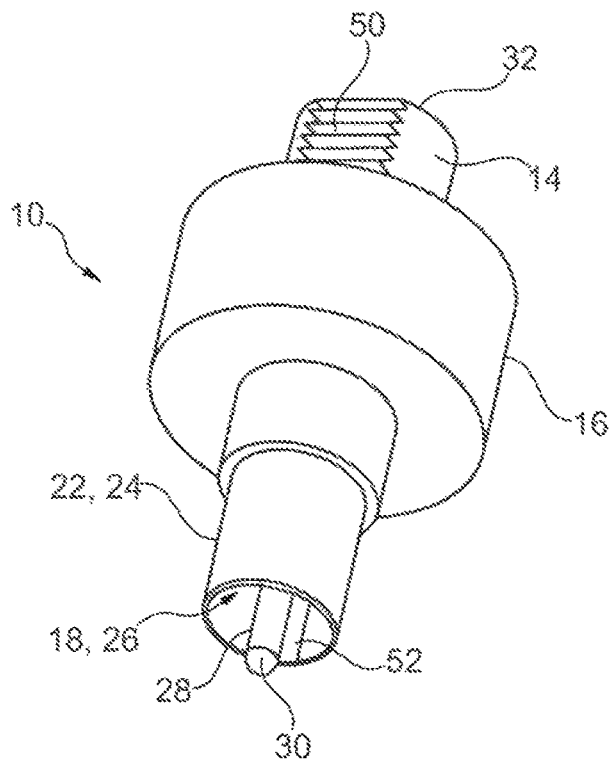
FIG. 4 shows the measuring device in a side view.

Lastly, FIG. 4 shows the measuring device 10 in a perspective side view. Here, the configuration of the retainer 14 as a VDI 40 tool retainer with the typical toothing structure 50 can be seen clearly.

As an alternative, the movement mechanism of the protective cover 22 could also be driven by means of a cooling lubricant or by means of springs. The variant proposed in the exemplary embodiment shown is capable of defining and interrogating the position of the protective cover 22 with the (motor) drive. With other variants (springs), a clear definition of the position is not possible, or is possible only with great difficulty.

LIST OF REFERENCES 10 measuring device
12 longitudinal axis
14 retainer
16 transmission 18 measurement head
20 tool drive
22 protective cover
24 protective sleeve
26 measurement sensor
28 sensing arm
30 end, one
32 end, other
34 recess
36 transmission input
38 toothed wheel arrangement
40 threaded spindle
42 threaded spindle
44 engagement structure
46 engagement structure
48 nut
50 toothing structure
52 guide structure

The invention claimed is:

1. A measuring device for a machine tool comprising a tool drive, the measuring device comprising:
 a measurement head; and
 a displaceably mounted protective cover configured to be moved by the tool drive in such a way that the protective cover selectively covers the measurement head or frees it for measurement.

2. The measuring device as claimed in claim 1, wherein the protective cover is configured as a protective sleeve.

3. The measuring device as claimed in claim 1, further comprising a transmission having at least one threaded spindle and at least one engagement structure,
 wherein the at least one engagement structure is in engagement with the threaded spindle and is configured to move the protective cover.

4. The measuring device as claimed in claim 3, wherein the protective cover comprises the at least one engagement structure.

5. The measuring device as claimed in claim 3, further comprising a retainer configured to fasten the measuring device in or on a tool holder of the machine tool.

6. The measuring device as claimed in claim 5, wherein a recess extending as far as the transmission is formed in the retainer, said recess allowing the tool drive to extend through the retainer as far as a transmission input.

7. The measuring device as claimed in claim 1, wherein the measurement head is configured as a measurement sensor having a sensing arm.

8. The measuring device as claimed in claim 5, wherein the retainer externally circumferentially comprises a toothing structure for form-fit fastening on/in a location, intended for a tool, of the machine tool.

9. The measuring device as claimed in claim 5, wherein the measuring device has a longitudinal axis, along which the retainer, transmission and measurement head are arranged successively.

10. A machine tool having a tool drive and a measuring device as claimed in claim 1.

11. A measuring device for a machine tool comprising a tool drive, the measuring device comprising:
 a measurement head; and
 a displaceably mounted protective cover configured to be moved by the tool drive between a first position where the protective cover selectively covers the measurement head and a second position where the measurement head is freed for measurement.

12. The measuring device as claimed in claim 11, wherein the protective cover is configured as a protective sleeve.

13. The measuring device as claimed in claim 11, further comprising a transmission having at least one threaded spindle and at least one engagement structure,
 wherein the at least one engagement structure is in engagement with the threaded spindle and is configured to move the protective cover.

14. The measuring device as claimed in claim 13, wherein the protective cover comprises the at least one engagement structure.

15. The measuring device as claimed in claim 13, further comprising a retainer configured to fasten the measuring device in or on a tool holder of the machine tool.

16. The measuring device as claimed in claim 15, wherein a recess extending as far as the transmission is formed in the retainer, said recess allowing the tool drive to extend through the retainer as far as a transmission input of the transmission.

17. The measuring device as claimed in claim 11, wherein the measurement head is configured as a measurement sensor having a sensing arm.

18. The measuring device as claimed in claim 15, wherein the retainer externally circumferentially comprises a toothing structure for form-fit fastening on/in a location, intended for a tool, of the machine tool.

19. The measuring device as claimed in claim 15, where the measuring device has a longitudinal axis, along which the retainer, transmission and measurement head are arranged successively.

20. A machine tool having a tool drive and a measuring device as claimed in claim 11.

* * * * *